United States Patent [19]

Freudenberg et al.

[11] Patent Number: 5,153,153
[45] Date of Patent: Oct. 6, 1992

[54] SINTERED CERAMIC MATERIALS BASED ON ALUMINIUM TITANATE, A PROCESS FOR THEIR PRODUCTION AND THEIR USE

[75] Inventors: Bernhard Freudenberg, Coburg; Johannes Seyer; Ernst Gugel, both of Roedental, all of Fed. Rep. of Germany

[73] Assignee: Bayer Aktiengesellschaft, Leverkusen, Fed. Rep. of Germany

[21] Appl. No.: 712,461

[22] Filed: Jun. 10, 1991

[30] Foreign Application Priority Data

Jun. 22, 1990 [DE] Fed. Rep. of Germany ....... 4019862
Sep. 14, 1990 [DE] Fed. Rep. of Germany ....... 4029166

[51] Int. Cl.$^5$ .................... C04B 35/10; C04B 35/46
[52] U.S. Cl. .................... 501/127; 501/128; 501/131; 501/134; 501/136
[58] Field of Search ............... 501/134, 136, 128, 131, 501/127

[56] References Cited

U.S. PATENT DOCUMENTS

| | | | |
|---|---|---|---|
| 2,776,896 | 1/1957 | Harman et al. | 501/134 |
| 4,118,240 | 10/1978 | Takabatake | 501/134 |
| 4,277,539 | 7/1981 | Keller et al. | 501/20 X |
| 4,483,944 | 11/1984 | Day et al. | 501/128 X |
| 4,767,731 | 8/1988 | Asami et al. | 501/128 |
| 4,855,265 | 8/1989 | Day et al. | 501/128 |
| 4,895,815 | 1/1990 | Olapinski et al. | 501/128 X |
| 5,008,222 | 4/1991 | Kameda | 501/134 |
| 5,055,435 | 10/1991 | Hamanaka et al. | 501/128 X |
| 5,066,626 | 11/1991 | Fukao et al. | 501/128 |

FOREIGN PATENT DOCUMENTS 0133021 2/1985 European Pat. Off. .
0210813 2/1987 European Pat. Off. .
2408557 6/1979 France .

Primary Examiner—Karl Group
Attorney, Agent, or Firm—Connolly and Hutz

[57] ABSTRACT

Sintered ceramic material which comprises doped aluminum titanate and mullite having the composition:
  50-61.5% by weight $Al_2O_3$,
  36-47.5% by weight titanium oxide, expressed as $TiO_2$,
  2.5-5% by weight $SiO_2$,
with the sum total of the three components adding up to 100%, and which further comprises 0.3 to 1% by weight MgO and up to 1% by weight impurities, useful as, inter alia, filters, catalyst supports and internal combustion engine parts, are prepared by mixing and shaping materials of suitable composition and then sintering the shaped composition at temperatures of 1250° to 1600° C. over a holding time of 0.5 to 100 hours.

15 Claims, No Drawings

SINTERED CERAMIC MATERIALS BASED ON ALUMINIUM TITANATE, A PROCESS FOR THEIR PRODUCTION AND THEIR USE

This invention relates to sintered ceramic material based on the main phases of doped aluminium titanate and mullite having the following composition:

50 to 61.5% by weight $Al_2O_3$,
36 to 47.5% by weight titanium oxide, expressed as $TiO_2$,
2.5 to 5% by weight $SiO_2$, the sum total of the three components being 100%, and up to 1% by weight impurities, to processes for the production of these sintered moldings and to their use.

BACKGROUND OF THE INVENTION

Materials which retain their thermomechanical properties, particularly strength and thermal shock resistance, even under extremely reducing conditions, are required in process engineering and particularly in melt metallurgy.

Although ceramics based on pure aluminium titanate or tialite show interesting properties, such as a low thermal expansion coefficient (TEC) and a low Young's modulus, they are of only limited technological value on account of their very poor strength and their tendency to decompose at temperatures in the range from about 900° to 1300° C. At temperatures in this range, tialite decomposes into the starting oxides $Al_2O_3$ and $TiO_2$, accompanied by a pronounced increase in the TEC and a correspondingly inadequate thermal shock resistance.

Numerous attempts have been made to counteract this tendency towards decomposition. Thus, U.S. Pat. No. 2,776,896 refers to the stabilizing effect of iron solid solutions in $Al_2TiO_5$. $SiO_2$ and MgO also show a stabilizing effect, although it is not as pronounced as in cases where the preferred $Fe_2O_3$ is added. However, it is pointed out that additions of $SiO_2$ and MgO can be used for stabilization when the electrical properties, the color or the susceptibility to reduction of the iron-containing aluminium titanate are not wanted.

The superiority of iron stabilization is also described in DE-A 3 814 079, according to which an adequate $Fe_2O_3$ concentration is responsible for long-term stabilization.

This no longer applies when the stability of aluminium titanate under strongly reducing or varying atmospheres is investigated. Thus, an $Al_2TiO_5$ ceramic stabilized solely with additions of $Fe_2O_3$ shows signs of decomposition in a pure CO atmosphere at a temperature of 1050° C.

The problem addressed by the present invention was to provide an inexpensive aluminium titanate ceramic which would show sufficient resistance to decomposition at temperatures of $\geq 1000°$ C. both under strongly reducing conditions (for example CO) and under oxidizing conditions (for example air) to retain its thermomechanical properties, particularly its strength and thermal shock resistance.

There are only limited references in the prior art to improving the susceptibility of aluminium titanate ceramic to reduction. Thus, U.S. Pat. No. 4,118,240 describes additions of 1.5 to 10% by weight $SnO_2$ and 2 to 13% by weight $SiO_2$ or 0.5 to 10% by weight rare earth oxide and 2 to 13% by weight $SiO_2$. Samples are said to show improved resistance to decomposition, even under reducing conditions. Flexural strength at room temperature is only of the order of 18 to 35 MPa.

Although there is much more patent literature relating to $SiO_2$—, MgO— and $Fe_2O_3$— containing aluminium titanate ceramic, there are no apparent solutions to the problem stated above.

EP-B 37 868 describes an aluminium titanate ceramic containing 1 to 20% by weight $SiO_2$ (preferably 2 to 15% by weight), 1.2 to 20% by weight MgO (preferably 2 to 17% by weight) and 0.5 to 20% by weight $Fe_2O_3$ (preferably 2 to 10% by weight). Flexural strengths of only 7 to 35 MPa are measured at room temperature.

EP-A 210 813 describes a low-glass aluminium titanate/mullite ceramic containing at least one presynthetized component, namely aluminium titanate and/or mullite. The ceramic contains at least 1.2% by weight $Fe_2O_3$. For a maximum MgO content of 0.8% by weight, the $MgO:Fe_2O_3$ ratio is $\geq 0.67$. Resistance to decomposition under highly reducing conditions is not guaranteed.

DD-B 29 794 claims an aluminium titanate ceramic containing additions of 0 to 40% by weight $SiO_2$ and 0 to 20% by weight MgO. In addition, 0.05 to 15% by weight of the oxides Zn, Ca, Ba, Fe, Ni, Cu, Mn and Cr may be added. In Example 4, 20% by weight MgO and 1.5% by weight $Fe_2O_3$ are added, which gives a ceramic of insignificant strength.

DE-C 2 750 290 describes a silicate-containing aluminium titanate ceramic produced from a raw material mixture containing 2 to 5% by weight kaolin and 0.1 to 1% by weight magnesium silicate. Under the assumption that the magnesium silicate is sepiolite (column 4, line 36), this corresponds to an $SiO_2$ content of 1.0 to 2.9% by weight and to an MgO content of 0.025 to 0.25% by weight. The material calcined at temperatures of 1350° to 1450° C. has strengths of 30 to 40 MPa (Examples 4 and 5), a Young's modulus of approximately 13 GPa and a TEC (measured in the range from 25° to 1000° C.) of 1.3 to $1.5 \times 10^{-6}$ 1/K. There are no quantitative references to the resistance to decomposition under reducing or oxidizing conditions.

DE-A 3 644 664 describes an aluminium titanate ceramic containing four additives, namely: 2.5 to 3.0% by weight $SiO_2$, 0.5 to 1.0% by weight MgO, 0.1 to 1.5% by weight $Fe_2O_3$ (preferably 0.5 to 1% by weight) and 0.1 to 2.5% by weight $La_2O_3$ (preferably 0.5 to 2.0% by weight). The Example contains 2.56% by weight $SiO_2$, 0.74% by weight MgO, 0.74% by weight $Fe_2O_3$ and 1.96% by weight $La_2O_3$. After heating for 100 h at 1100° C. (there is no mention of the atmosphere), this ceramic still contains 61% $Al_2TiO_5$. However, this ceramic is not sufficiently resistant to decomposition under reducing conditions.

BRIEF DESCRIPTION OF THE INVENTION

A sintered ceramic body based on aluminium titanate has now surprisingly been found which eminently satisfies the above-stated requirement of improved resistance to decomposition both under strongly reducing conditions and under oxidizing conditions. To this end, it need only contain the two inexpensive additives from the system of silicon and magnesium. Thus, the ceramic bodies of the present invention contain mostly aluminium oxide and titanium oxide but also contain 2.5 to 5% by weight silicon dioxide and 0.3 to 1% by weight of magnesium oxide. These phase composition is mainly aluminium titanate solid solution and mullite solid solution.

DETAILED DESCRIPTION

The material according to the invention, which is described in detail hereinafter and which is produced by careful selection of the composition and correspondingly adapted process management, particularly during sintering, satisfies all the technical and economic requirements stated above.

The present invention relates to sintered ceramic bodies based on the main phases of doped aluminium titanate and mullite which has the following chemical composition:

50 to 61.5% by weight $Al_2O_3$, 36 to 47.5% by weight titanium oxide, expressed as $TiO_2$, 2.5 to 5% by weight $SiO_2$, the sum total of the three components adding up to 100%, and up to 1% by weight impurities, characterized in that the sintered molding additionally contains 0.3 to 1% by weight MgO.

In its calcined state, the material according to the invention essentially consists of two crystalline phases, namely: an Mg-doped $Al_2TiO_5$ phase and the mullite phase which is assumed to be $3Al_2O_3.2SiO_2$.

The optimal MgO content is a compromise between the requirements of maximum resistance to decomposition, maximum fracture strain and miminum shrinkage during sintering.

It has surprisingly been found that the resistance to decomposition under reducing conditions falls distinctly at Mg concentrations (expressed as MgO) below 0.3% by weight whereas resistance to decomposition under oxidizing conditions remains substantially constant in the range investigated. At MgO contents above 1% by weight, there is a further reduction in fracture strain. However, a high fracture strain is crucial to the thermal shock resistance required. In addition, there is a further increase in shrinkage during sintering; the higher the shrinkage during sintering, the more difficult it is to keep to the narrow tolerances with "as-fired" components.

In one preferred embodiment, therefore, the sintered molding according to the invention has an MgO content of 0.3 to 0.6% by weight.

Numerous decomposition tests have shown that, although increased iron concentrations improve resistance to decomposition under oxidizing conditions, they also impair the resistance to decomposition under reducing conditions. In one preferred embodiment, the sintered ceramic according to the invention additionally has an iron oxide content of 0.015 to 0.5% by weight and, more preferably, in the range from 0.05 to 0.4% by weight, expressed as $Fe_2O_3$. The % by weight ratio of MgO to $Fe_2O_3$ is preferably between 20 and 2.

The $SiO_2$ content is also a compromise between various requirements, including maximum resistance to decomposition, minimum Young's modulus and minimum coefficient of thermal expansion. Both the TEC and the Young's modulus increase with increasing $SiO_2$ content, so that the thermal shock resistance is adversely affected. Accordingly, the upper limit is at 5% by weight $SiO_2$. In view of the poor resistance to decomposition under oxidizing conditions, the lower limit is at 2.5% by weight and preferably at 3% by weight.

Sintered bodies according to the invention show particularly high resistance to decomposition when the sum total of the contents of unreacted $Al_2O_3$ and $TiO_2$ is $\leq 5\%$ by weight, preferably $\leq 2.5\%$ by weight.

The sintered moldings according to the invention are distinguished by a combination of particularly favorable physical properties. Thus, their flexural strength at room temperature is in the range from 40 to 80 MPa, their Young's modulus is between 5 and 25 GPa and their TEC (RT-1000° C.) is in the range from $0-2.5\times10^{-6}$ 1/K. Resistance to decomposition is guaranteed, even after more than 100 hours at 1000° C. both under oxidizing and under reducing conditions. The accelerated decomposition tests under oxidizing and reducing conditions reveal a tialite content of more than 60% by weight in the decomposition test under oxidizing conditions and more than 75% by weight in the decomposition test under reducing conditions.

Another advantage and characteristics feature of the sintered ceramic according to the invention is that they can be sintered at relatively low temperatures with short holding times. The ceramic is sintered at temperatures of 1250° to 1600° C. and preferably at temperatures of 1300° to 1450° C. with a holding time of 0.5 to 100 hours and preferably with a holding time of 1 to 50 hours.

Accordingly, the present invention also relates to a process for the production of the sintered ceramic body according to the invention, characterized in that it comprises the steps of mixing, shaping and sintering suitable materials.

Shaping may be carried out in known manner by slip casting. Shaping may also be carried out by molding and pressing a powder mixture having the composition according to the invention which contains the usual binders. It has proved to be of particular advantage to use the raw materials predispersed by wet grinding with subsequent granulation drying; the raw materials may either be individually wet-ground and subsequently mixed before granulation drying or may be wet-ground together in the form of a mixture. These granules provide for much shorter dispersion times in the preparation of the slip than where the individual components are used. In addition, the presence of only one premixed component provides for simpler storage and for better dosability than in cases where several components differing their apparent densities are used.

In addition, the dried granules are paricularly suitable for dry pressing.

In one particularly preferred variant of the process according to the invention, therefore, the components are predispersed individually or in admixture by wet grinding, preferably by grinding in an attritor mixture of wet-ground components is subsequently processed by granulation drying, preferably by spray drying, and used as the raw material.

Sintering is preferably carried out by reaction sintering under the conditions mentioned above. Pre-reacted mixtures may also be successfully used. After sintering, the sintered ceramic body may be finished by known methods.

In one particularly advantageous embodiment, the magnesium compounds are introduced in the form of magnesium titanates, such as $Mg_2TiO_4$, $MgTiO_3$ and/or $MgTi_2O_5$. In practice, the use of magnesium titanate provides for a slip having a relatively high solids content for reduced shear thinning behavior. Another advantage of using magnesium titanate powder lies in its high reactivity. Another advantage of the synthetic magnesium over natural raw materials is its purity. The natural raw materials contain in particular alkali and calcium impurities which lead to a reduced resistance to decomposition in aluminium titanate ceramic.

In one preferred embodiment of the process according to the invention, the iron compounds were introduced into the mixture in the form of finely disperse α-$Fe_2O_3$ powder and/or preferably in the form of iron-containing layer silicates and, more preferably, in the form of iron-containing clays or kaolin.

Comparison of various iron raw material sources shows that iron-containing clays or kaolins are of particular advantage. One particular advantage of natural aluminium silicates lies in the fact that the clays/kaolins additionally represent an extremely inexpensive $SiO_2$ and $Al_2O_3$ raw material source.

The present invention also relates to the use of the sintered ceramic bodies according to the invention. They are particularly suitable for the production of hollow tube-like metal/ceramic composites. They are also suitable for reinforcing engine pistons and cylinder heads and as an incorporated element in catalysts, e.g. as spacer rings.

Another use is as a catalyst support, optionally after doping with catalytically active substances.

Another use is as filters, particularly as particle filters in diesel engines, optionally after doping with catalytically active substances and addition of porosity promoters.

By virtue of their favorable thermal and mechanical properties, the sintered materials according to the invention are also suitable for use as a material in melt metallurgy.

The following Examples are intended to illustrate the invention without limiting it in any way.

EXAMPLES

Batches having various MgO concentrations were compared. The raw materials used were $Al_2O_3$ powder (corundum, $d_{50}<0.5$ μm), $TiO_2$ powder (rutile, $d_{50}<0.5$ μm), $MgTiO_3$ powder ($d_{50}<0.8$ μm) and an iron-containing kaolin, the batch being calculated in accordance with the composition shown in Table I. After the addition of 30% by weight water and commercially available dispersants, the powders were ground for 12 hours to form a slip. The slip-cast hollow bodies were dried and then sintered for 5 hours at 1440° C. Quantitative phase analysis by X-ray diffractometry was carried out on the sintered body both as fired and as well after an additional decomposition test under oxidizing conditions (40 hours, 1100° C., static air) and after a decomposition test under reducing conditions (20 hours, 1050° C., CO atmosphere, flowing). Assuming equilibrium conditions, the reducing atmosphere corresponds to an oxygen partial pressure $p_{O2}\approx 10^{18}$ atm. Fracture strain was calculated from the flexural strength at room temperature and the static Young's modulus elasticity. The linear sintering shrinkage was calculated from the green and sinter densities.

The results in Table I show that the resistance to decomposition under reducing conditions falls drastically below 0.3% by weight MgO in contrast to the resistance to decomposition under oxidizing conditions. Above 1% by weight MgO, the decreasing fracture strain and increasing sintering shrinkage reach very unfavorable values.

TABLE I

Resistance to decomposition, fracture strain and shrinkage on sintering for samples of different Mg content

| Example | 1 (Comparison) | 2 (Comparison) | 3 | 4 | 5 (Comparison) |
|---|---|---|---|---|---|
| Cat. % Mg in the tialite lattice | 0.2 | 0.4 | 0.6 | 1.0 | 2.0 |
| Cat. % Fe in the tialite lattice | 0.14 | 0.14 | 0.14 | 0.14 | 0.14 |
| Raw materials | $Al_2O_3$, $TiO_2$ Kaolin (Fe) $MgTiO_3$ | $Al_2O_3$, $TiO_2$ Kaolin (Fe) $MgTiO_3$ | $Al_2O_3$, $TiO_2$ Kaolin (Fe) $MgTiO_3$ | $Al_2O_3$, $TiO_2$ Kaolin (Fe) $MgTiO_3$ | $Al_2O_3$, $TiO_2$ Kaolin (Fe) $MgTiO_3$ |
| Chemical composition [% by weight] | | | | | |
| $Al_2O_3$ | 57.67 | 57.35 | 57.02 | 56.38 | 54.76 |
| $TiO_2$ | 38.72 | 38.93 | 39.14 | 39.56 | 40.61 |
| $SiO_2$ | 3.48 | 3.48 | 3.48 | 3.47 | 3.46 |
| MgO | 0.13 | 0.24 | 0.36 | 0.59 | 1.17 |
| $Fe_2O_3$ | 0.16 | 0.16 | 0.16 | 0.16 | 0.16 |
| Sintering conditions | 5 h/1440° C. | 5 h/1440° C. | 5 h/1440° C. | 5 h/1440° C. | 5 h/1440° C. |
| $Al_2TiO_5$ content [% by weight] | | | | | |
| as fired | 91 | 95 | 92 | 90 | 90 |
| Decomposition test - oxidizing | 80 | 78 | 76 | 78 | 82 |
| Decomposition test - reducing | 7 | 77 | 85 | 91 | 86 |
| Fracture strain [0/00] | 2.9 | 2.6 | 2.4 | 2.4 | 2.1 |
| Linear shrinkage after sintering [%] | 10.6 | 11.5 | 12.3 | 13.1 | 14.2 |

The influence of the MgO:$Fe_2O_3$ ratio is demonstrated by the results in Table II.

The three batches mentioned were prepared from $TiO_2$ powder (rutile, $d_{50}<0.5$ μm), $Al_2O_3$ powder (corundum, $d_{50}<0.5$ μm), $SiO_2$ powder ($d_{50}<0.3$ μm), $MgTiO_3$ powder ($d_{50}<0.8$ μm) and $Fe_2O_3$ powder ($d_{50}<0.2$ μm); the compositions correspond to Table II.

All three batches were calculated so that 0.8 cat.-%, i.e. 0.8% of all the cations in the $Al_2TiO_5$ lattice, are substituted by Mg or Mg+Fe. The calculation was based on the simplifying assumption that Mg and Fe are incorporated exclusively in the tialite lattice. The results shown confirm the fact known from the literature that even small Fe-additions produce a distinct improvement in the resistance to decomposition under oxidizing conditions. What is unexpected, however, is that these additions greatly impair the resistance to decomposition under reducing conditions.

TABLE II

Resistance to decomposition under oxidizing and reducing conditions for samples having different Mg:Fe ratios, Mg + Fe [cat.-%] = const.

| Example | 6 | 7 | 8 |
|---|---|---|---|
| Cat. % Mg in the | 0.8 | 0.6 | 0.4 |

TABLE II-continued

Resistance to decomposition under oxidizing and reducing conditions for samples having different Mg:Fe ratios.
Mg + Fe [cat.-%] = const.

| Example | 6 | 7 | 8 |
|---|---|---|---|
| $Al_2TiO_5$ lattice Cat. % Fe in the $Al_2TiO_5$ lattice | — | 0.2 | 0.4 |
| Raw materials | $Al_2O_3$, $TiO_2$ $SiO_2$, $MgTiO_3$ $Fe_2O_3$ | $Al_2O_3$, $TiO_2$ $SiO_2$, $MgTiO_3$ $Fe_2O_3$ | $Al_2O_3$, $TiO_2$ $SiO_2$, $MgTiO_3$ $Fe_2O_3$ |
| Chemical composition [% by weight] | | | |
| $Al_2O_3$ | 55.96 | 56.10 | 56.23 |
| $TiO_2$ | 40.94 | 40.68 | 40.42 |
| $SiO_2$ | 2.61 | 2.61 | 2.61 |
| MgO | 0.49 | 0.38 | 0.25 |
| $Fe_2O_3$ | — | 0.24 | 0.48 |
| Sintering conditions | 5 h/1400° C. | 5 h/1400° C. | 5 h/1400° C. |
| $Al_2TiO_5$ content [% by weight] | | | |
| Sintered | 96 | 97 | 94 |
| Decomposition test, oxidizing | 32 | 62 | 68 |
| Decomposition test, reducing | 75 | 25 | 4 |

Influence of the Fe Raw Material Source

Two batches having the same global chemical composition are compared in the Table III. The difference is that silicon and iron are introduced on the one hand through two raw materials—>98% pure $SiO_2$ powder ($d_{50}<0.3$ μm) and $Fe_2O_3$ powder ($d_{50}<0.3$ μm)—and on the other hand through a single raw material—kaolin containing 1.5 to 2% by weight $Fe_2O_3$. The results in Table III show that the iron introduced through the kaolin contributes to a much better resistance to decomposition under oxidizing and reducing conditions.

TABLE III-continued

Resistance to decomposition under oxidizing and reducing conditions for samples with different $SiO_2$ and $Fe_2O_3$ raw material sources

| Example | 9 | 3 |
|---|---|---|
| Cat. % Fe in the $Al_2TiO_5$ lattice | 0.14 | 0.14 |
| Raw materials | $Al_2O_3$, $TiO_2$ $SiO_2$, $MgTiO_3$ $Fe_2O_3$ | $Al_2O_3$, $TiO_2$ Kaolin (Fe) $MgTiO_3$ |
| Chemical composition [% by weight] | | |
| $Al_2O_3$ | 56.89 | 57.02 |
| $TiO_2$ | 39.12 | 39.14 |
| $SiO_2$ | 3.47 | 3.48 |
| MgO | 0.36 | 0.36 |
| $Fe_2O_3$ | 0.16 | 0.16 |
| Sintering conditions | 5 h/1440° C. | 5 h/1440° C. |
| $Al_2TiO_5$ content [% by weight] | | |
| Sintered | 96 | 92 |
| Decomposition test, oxidizing | 58 | 76 |
| Decomposition test, reducing | 72 | 85 |

Batches having different $SiO_2$ contents are compared in Table 4. The resistance to decomposition under oxidizing conditions falls drastically with Si contents (expressed as $SiO_2$) of less than 2.5% by weight. By contrast, the resistance to decomposition under reducing conditions remains substantially constant under the selected conditions. The exact stabilizing mechanisms for $SiO_2$—which are important to stability under oxidizing conditions—and for MgO—which are important to stability under reducing conditions—are known. As the $SiO_2$ content increases, both the TEC and the Young's modulus increase, thus leading to a deterioration in thermal shock resistance. It is for this reason that the upper limit for the $SiO_2$ content is 5% by weight.

TABLE IV

Resistance to decomposition, modulus of elasticity and thermal expansion coefficient (TEC) for samples having different $SiO_2$ contents

| Example | 10 (comparison) | 3 | 11 | 12 (comparison) |
|---|---|---|---|---|
| Cat. % Mg in the tialite lattice | 0.6 | 0.6 | 0.6 | 0.6 |
| Cat. % Fe in the tialite lattice | 0.07 | 0.14 | 0.18 | 0.23 |
| Raw materials | $Al_2O_3$, $TiO_2$ Kaolin (Fe) $MgTiO_3$ | $Al_2O_3$, $TiO_2$ Kaolin (Fe) $MgTiO_3$ | $Al_2O_3$, $TiO_2$ Kaolin (Fe) $MgTiO_3$ | $Al_2O_3$, $TiO_2$ Kaolin (Fe) $MgTiO_3$ |
| Chemical composition [% by weight] | | | | |
| $Al_2O_3$ | 56.06 | 57.02 | 57.61 | 58.14 |
| $TiO_2$ | 41.71 | 39.14 | 37.60 | 36.17 |
| $SiO_2$ | 1.86 | 3.48 | 4.45 | 5.35 |
| MgO | 0.38 | 0.36 | 0.35 | 0.33 |
| $Fe_2O_3$ | 0.09 | 0.16 | 0.20 | 0.24 |
| Sintering conditions | 5 h/1440° C. | 5 h/1440° C. | 5 h/1440° C. | 5 h/1440° C. |
| $Al_2TiO_5$ content [% by weight] | | | | |
| Sintered | 99 | 92 | 85 | 85 |
| Decomposition test - oxidizing | 65 | 76 | 81 | 81 |
| Decomposition test - reducing | 94 | 85 | 86 | 76 |
| Modulus of elasticity [GPa] | 9 | 20 | 24 | 27.5 |
| TEC [RT - 1000° C.] [$10^{-6}$ 1/K] | 0.75 | 1.9 | 2.55 | 2.9 |

TABLE III

Resistance to decomposition under oxidizing and reducing conditions for samples with different $SiO_2$ and $Fe_2O_3$ raw material sources

| Example | 9 | 3 |
|---|---|---|
| Cat. % Mg in the $Al_2TiO_5$ lattice | 0.6 | 0.6 |

The preceding batches were calculated under the assumptions that only two crystalline phases, aluminium titanate ($Al_2O_3.TiO_2$) and mullite (3 $Al_2O_3.2$ $SiO_2$), are formed and that Mg and Fe dissolve completely in the aluminium titanate lattice i.e. form a solid solution. Under the conditions mentioned, the batches also reacted almost completely, so that less than 5% by weight of unreacted residual oxides ($Al_2O_3 + TiO_2$) were present under carefully controlled process conditions. The residual oxide content is usually less than 2.5% by weight. If excess aluminium oxide is additionally added, Table V, the decomposition process is distinctly accelerated.

TABLE V

Resistance to decomposition for samples with different $Al_2O_3$ excesses

| Example | 3 | 13 | 14 |
|---|---|---|---|
| Cat. % Mg in the tialite lattice | 0.6 | 0.6 | 0.6 |
| Cat. % Fe in the tialite lattice | 0.14 | 0.14 | 0.14 |
| $Al_2O_3$ excess [% by vol.] calculated | 0 | 1.5 | 5 |
| Raw materials | $Al_2O_3$, $TiO_2$ Kaolin (Fe) $MgTiO_3$ | $Al_2O_3$, $TiO_2$ Kaolin (Fe) $MgTiO_3$ | $Al_2O_3$, $TiO_2$ Kaolin (Fe) $MgTiO_3$ |
| Chemical composition [% by weight] | | | |
| $Al_2O_3$ | 57.02 | 57.73 | 59.37 |
| $TiO_2$ | 39.14 | 38.49 | 37.00 |
| $SiO_2$ | 3.48 | 3.42 | 3.29 |
| MgO | 0.36 | 0.36 | 0.34 |
| $Fe_2O_3$ | 0.16 | 0.16 | 0.15 |
| Sintering conditions | 5 h/1440° C. | 5 h/1440° C. | 5 h/1440° C. |
| $Al_2TiO_5$ content [% by weight] | | | |
| Sintered | 92 | 88 | 90 |
| Decomposition test, oxidizing | 76 | 47 | 6 |
| Decomposition test, reducing | 85 | 69 | 25 |

The following properties were measured on the batches of Examples 3 and 4:

TABLE VI

Properties of Examples 3 and 4

| | Example 3 | Example 4 |
|---|---|---|
| Density (g/cm$^3$) | 3.26 | 3.34 |
| 4-Point flexural strength (MPa) | 48 | 50 |
| static Young's modulus (GPa) | 20 | 21 |
| TEC (RT - 1000° C.) ($10^{-6}$ 1/K) | 1.9 | 2.0 |
| Phase composition (% by weight) measured by diffraction | | |
| in fired state | $Al_2/TiO_5$/mullite $Al_2O_3/TiO_2$ | 92/9 0/0 | 90/9 0/0 |
| after decomposition test under oxidizing conditions | $Al_2TiO_5$/mullite $Al_2O_3/TiO_2$ | 76/8 7/4 | 78/11 4/3 |
| after decomposition test under reducing conditions | $Al_2TiO_5$/mullite $Al_2O_3/TiO_2$ | 85/8 1,5/0,5 | 91/9 0/0 |

In one particularly preferred procedure, the raw materials (for formulation, see "Examples") were suspended together with water (30% by weight) and a commercially available dispersant, ground in an attritor and the slip obtained was conventionally spray-dried. After redispersion in water and homogenization for 1 to 3 hours in a ball mill, a slip is obtained with no further additions and is processed by the method described in the Examples.

What is claimed is:

1. Sintered ceramic body which comprise doped aluminum titanate and mullite having the composition:
   50–61.5% by weight $Al_2O_3$,
   36–47.5% by weight titanium oxide, expressed as $TiO_2$,
   2.5–5% by weight $SiO_2$.
   with the sum total of the three components adding up to 100%, and which further comprise 0.3 to 1% by weight MgO, 0.015 to 0.5% by weight iron oxide, expressed as $Fe_2O_3$ and up to 1% by weight impurities.

2. Sintered ceramic body as claimed in claim 1 wherein the MgO content is 0.3 to 0.6% by weight.

3. Sintered ceramic body as claimed in claim 1 wherein the iron oxide content, expressed as $Fe_2O_3$, is 0.05 to 0.4% by weight.

4. Sintered ceramic body as claimed in claim 1 wherein the percentage by weight ratio of MgO to $Fe_2O_3$ is between 20 and 2.

5. Sintered ceramic body as claimed in claim 2 wherein the iron oxide content, expressed as $Fe_2O_3$, is 0.05 to 0.4% by weight.

6. Sintered ceramic body as claimed in claim 2 wherein the percentage by weight ratio of MgO to $Fe_2O_3$ is between 20 and 2.

7. Sintered ceramic body as claimed in claim 1, wherein the sum total of the contents of unreacted $Al_2O_3$ and $TiO_2$ after sintering is 5% or lower, by weight.

8. Sintered ceramic body as claimed in claim 1, wherein the sum total of the contents of unreacted $Al_2O_3$ and $TiO_2$ after sintering is $\leq 2.5\%$ by weight.

9. A process for the production of sintered ceramic body which comprises the steps of mixing, shaping and sintering a composition comprising the following components:
   50–61.5% by weight $Al_2O_3$,
   36–47.5% by weight titanium oxide, expressed as $TiO_2$,
   2.5–5% by weight $SiO_2$,
   with the sum total of the three components adding up to 100%, and which further comprise 0.3 to 1% by weight MgO, 0.015 to 0.5% by weight iron oxide, expressed as $Fe_2O_3$ and up to 1% by weight impurities wherein the sintering of the ceramic body at temperatures of 1250° to 1600° C. over a holding time of 0.5 to 100 hours.

10. A process according to claim 9 wherein the sintering temperature is 1300° to 1450° C. over a holding time of 1 to 50 hours.

11. A process according to claim 9 wherein as a first step the components are predispersed individually or in admixture by wet grinding and the mixture of wet-ground components is subsequently processed by granulation drying.

12. A process according to claim 9 wherein the sintered ceramic body is reaction-sintered.

13. A process according to claim 9 wherein magnesium compounds are introduced into the composition as magnesium titanates, selected from the group consisting of $Mg_2TiO_4$, $MgTiO_3$, $MgTi_2O_5$, and mixtures thereof.

14. A process according to claim 9 wherein iron compounds are introduced into the composition in the form of finely dispersed $\alpha$-$Fe_2O_3$ powder, in the form of iron-containing layer silicates, or in the form of iron-containing kaolin.

15. A process accordingly to claim 9 wherein iron compounds are introduced into the composition in the form of iron containing clays.

* * * * *